Patented Apr. 3, 1934

1,953,440

UNITED STATES PATENT OFFICE

1,953,440

ELECTRICAL INSULATING MATERIALS

Willoughby Statham Smith, Benchams, Newton Poppleford, Henry Joseph Garnett, Solefields, Sevenoaks, John Norman Dean, Orpington, Bernard James Habgood, Bournemouth, and Henry Charles Channon, London, England No Drawing. Application June 29, 1929, Serial No. 374,948. In Great Britain July 4, 1928

13 Claims. (Cl. 18—50)

This invention relates to electrical insulating materials and has for its object the provision of improved electrical insulating materials having rubber as their base, which remain efficient when they are used for long periods under water.

The principal object of the invention is to provide an insulation for the conductors of submarine cables.

It is a known fact that rubber of the ordinary commercial quality cannot be used satisfactorily for insulating the conductors of submarine telegraph and telephone cables. When rubber has been tried for this purpose, the electrical characteristics essential for the successful operation of the cable have gradually deteriorated after the cable has been laid. This deterioration is due to the absorption of water by the rubber, whereby the efficiency of the cable has been reduced.

The raw rubber of commerce contains, besides rubber hydrocarbon, a large number of other substances known collectively to those engaged in rubber manufacture as non-rubber materials and comprising e. g. proteins, esters and glucosides. The presence of these non-rubber materials in the rubber is harmful when the latter is used for the electrical insulation of signalling conductors, as, especially after long immersion in water, they diminish the dielectric resistance and increase the dielectric constant and the alternating-current leakance of the insulation.

Certain of these non-rubber materials are soluble in water and may therefore be extracted from raw rubber by washing in water and it is found that an improvement in the electrical insulating properties of the rubber is obtained thereby. It has been shown that the water-absorbing power of raw rubber is largely due to the presence of these water-soluble constituents and a diminution in this power is shown by the rubber after their elimination. However, some of the non-rubber materials are nearly insoluble in water and remain therefore in the rubber where they have a detrimental effect since in the course of time certain of them decompose into chemically simpler compounds, e. g. amino-acids, which are soluble in water, so that the rubber absorbs more and more water as time goes on, with the consequent deterioration of its electrical properties and characteristics.

It is the object of this invention to remove these normally water insoluble bodies and thereby obtain an electrical insulating material suitable for indefinite use in water without appreciable deterioration.

According to the present invention the raw rubber is subjected in the presence of glycerol to a hydrolysis treatment such as to convert the ordinarily water insoluble bodies or impurities into bodies soluble in water whereby they may be removed by extraction with water. This conversion is preferably produced by the action of water at an elevated temperature.

In one manner of carrying out the invention an improved electrical insulating material is obtained by treating rubber with steam and superheated water to which glycerol has been added, thereby raising the normal boiling point, whereby certain of the non-rubber materials, that are themselves insoluble in water, are converted into water-soluble products which, together with the water-soluble constituents originally present in the rubber, can then be extracted from the rubber by water. The glycerol also aids in the action of hydrolysis since it attacks the proteins in the rubber causing them to swell and become more exposed to the hydrolyzing action of the water and steam on the raw rubber, which converts them and the other insoluble constituents of the non-rubber materials into chemically simpler bodies which are soluble in water. The raw rubber may either first be washed with water in the known way to remove the water-soluble constituents and then subjected to the above treatment to render some of the insoluble constituents water-soluble, or the raw rubber may be treated directly with the superheated water and steam in the presence of glycerol. In either case the rubber thus treated is finally thoroughly washed with water to extract the hydrolysis products from it.

The rubber to be treated is sheeted or is finely ground, and is placed in an autoclave. Sufficient water and glycerol is added to cover the rubber, and after the air inside the autoclave has been driven off or displaced by an inert gas, such as carbon dioxide, the vessel is closed and its temperature gradually raised to a suitable temperature say 150° C. to 250° C., and maintained at that value until the reaction has reached the desired stage of completion which will be about 6 hours at 150° C. It has been found desirable but not necessary to use an autoclave with some stirring or mixing device adapted continuously to expose fresh surfaces of the rubber After the autoclave has been allowed to cool, the rubber is removed and washed in the ordinary way. The process may be repeated if necessary a number of times on the same sample of rubber. Finally the rubber is sheeted out and dried.

As rubber from which the proteins have been removed absorbs oxygen very readily, thus deteriorating rapidly, rubber treated as described above should be stabilized by the addition of small quantities of anti-oxygens e. g. para-amino-phenol.

It has been found that rubber protein is partially soluble in glycerol and other hydroxy compounds. When raw rubber is heated in glycerol, preferably to a temperature of 150–250° C., the glycerol slowly diffuses into the rubber and swells the protein disseminated throughout the mass. When this swollen rubber is removed from the glycerol and treated with superheated water and steam, it is found that the reaction between the water and the protein is complete in about three hours, instead of about 24–30 hours as is the case where the preliminary treatment with e. g. glycerol is omitted. Other hydroxy compounds that are suitable include glycol and acetin.

According to another feature of the invention therefore the raw rubber is treated first with a compound capable of swelling the protein after which it is subjected to a hydrolysis action preferably with super-heated water and steam.

The extent of the purification of the rubber as a result of the treatments described above may be seen by reference to the following examples, where the protein content of the rubber before and after treatment is taken as the criterion for the reason that it is one of the most important of the non-rubber bodies and also because it can be easily estimated by analysis.

Example 1

White plantation crepe rubber was heated in glycerol to about 190° until the material had thoroughly swollen to a dark brown mass; this took about half-an-hour. The rubber was then removed from the hot glycerol, drained and then placed in an autoclave containing sufficient water to cover the rubber. The autoclave was then closed and the temperature of the contents raised to 150° C. for about 3½ hours when, after the apparatus had cooled, the rubber was removed, washed and dried.

As a result of this treatment, the protein content of the rubber was reduced from its original value of 2.8% in the raw rubber to 0.75% in the treated rubber. Without the combined treatment with glycerol and water, that is with a treatment only in an autoclave with water the treatment requires about 25½ hours for it to be complete, the reduction in the protein content being from 2.8% to 0.9%.

In a modification the rubber, prior to being subjected to a purification treatment by hydrolysis, is swollen by treatment with an organic solvent, such for example as benzene or toluene, either by immersing it in the medium or by exposing it to an atmosphere charged with the vapour of the medium. The swelling medium for the rubber should preferably be appreciably soluble in the superheated water at the temperature at which the latter is allowed to react with the proteins and other non rubber bodies in the rubber.

Example 2

White plantation crepe rubber was stored in an atmosphere charged with benzene vapour until it had absorbed about 10% of its weight of the solvent. It was then placed, together with water, in an autoclave and heated for three hours at 180° C. after which it was washed and dried.

As a result of this treatment the protein content of the rubber was reduced to 0.6%.

By means of the treatment of the present invention the raw rubber is rendered in a condition when it is more susceptible to a hydrolysis action for converting the water insoluble to soluble bodies since by expanding the raw rubber a greater superficial area is exposed to the action of the hydrolysing body. The expanding of the raw rubber may be accomplished either by swelling the rubber itself or by swelling the proteins therein. Moreover by choosing a suitable swelling medium or compound the hydrolysing body will more readily enter the rubber owing to its affinity for such medium.

Rubber prepared in accordance with the invention is more thermoplastic than the original raw rubber. By the removal of the non-rubber constituents, the electrical properties of the rubber, e. g. the dielectric resistance, the dielectric constant and the alternating current leakance, are rendered more permanent in the presence of moisture and the water absorbing power of the rubber is diminished When used for the insulation of submarine cables, the purified rubber obtained as a result of the treatments described above is preferably mixed with gutta percha and/or balata, preferably purified in the way described in British Patent No. 307,390. Or the purified rubber may be used as the rubber constituent of the mixture described in British Patent No. 329,275.

A composition prepared from rubber having a protein content of 0.9% gutta percha of ordinary good quality and a high melting point bitumen had a dielectric constant of 2.80. After the composition had been immersed in water for three months, its dielectric constant had risen to 2.95. A similar composition, but made with ordinary rubber had an initial dielectric constant of 2.78, but after the composition had been immersed in water for three months, the value of the dielectric constant had risen to 3.18.

A composition prepared from rubber purified in accordance with the method described in Example 1 above, and mixed with an equal weight of dirt—and resin-free gutta percha, had a dielectric constant, when tested at 35° F. and 2000 cycles, of 2.53; this value increased to 2.66 on storing the material in water for three months. The dielectric constant of a control composition containing the same proportion of ordinary rubber rose from 2.53 to 2.84 under the same conditions. The values of the alternating current leakance of both compositions remained below 10 micro-micro-mhos per cm$^3$ at 35° F., and 2000 cycles.

For example, a composition was prepared from rubber purified in accordance with the method described in Example 1 above, mixed with zinc oxide, sulphur, a high melting point bitumen of low ash- and free carbon-content and vulcanized. The dielectric constant of this composition rose from 2.84 to 3.01 when the material was stored in water, while the corresponding value for that of a similar composition, but containing ordinary rubber, rose in the same time from a similar initial value to 3.15.

According to this invention also insulating material comprises rubber purified by removal of its non rubber content admixed with a hardening material such as gutta percha and/or balata.

Rubber prepared in accordance with the invention is suitable, after the addition of appropriate fillers, accelerators and other accessories, for vulcanization by known methods.

Although the treatment described in this specification has so far been made specific to rubber, it will be readily understood by those engaged in the treatment of plastic gums that the same treatment can be applied to mixtures of rubber with gutta percha, balata and allied gums and to latices, e. g. rubber latex.

What we claim is:—

1. The manufacture from rubber of an insulating material which comprises subjecting the rubber in the presence of glycerol to a treatment at a temperature and for a period sufficient to render by hydrolysis the water insoluble bodies soluble, and then removing said bodies by washing.

2. The manufacture from rubber of an insulating material which comprises subjecting the rubber to a treatment with superheated water and steam in the presence of glycerol for a period sufficient to render by hydrolysis the water insoluble bodies soluble and then removing said bodies by washing.

3. The manufacture from rubber of an insulating material which comprises treating the rubber with a medium to swell the protein and then subjecting the rubber to a treatment to convert by hydrolysis the water insoluble into soluble bodies and finally removing said bodies by washing.

4. The manufacture from rubber of an insulating material which comprises heating the rubber in glycerol at a temperature of 150°–250° C. and then treating the expanded rubber with superheated steam and water to convert by hydrolysis the water insoluble into soluble bodies and finally removing said bodies by washing.

5. The manufacture from rubber of an insulating material which comprises heating the rubber in a hydroxy compound at a temperature of 150°–250° C., and then treating the expanded rubber with superheated steam and water to convert by hydrolysis the water insoluble into soluble bodies and finally removing said bodies by washing.

6. A process of treating material containing rubber hydrocarbon and a protein or other naturally occurring nitrogenous substance which comprises subjecting the material to the action of a medium capable of causing the rubber to expand and then subjecting the expanded rubber to a treatment to convert, by hydrolysis, the protein into a water soluble body, and finally removing said body by washing.

7. A method of treating rubber containing hydrocarbon and another substance which is normally insoluble in water and which after prolonged immersion in water becomes highly water absorbent which comprises subjecting the rubber to the action of a medium capable of expanding the rubber and then subjecting the expanded rubber to a treatment to convert, by hydrolysis, the normally water insoluble substance into a soluble substance, and finally removing said substance by washing.

8. A method of treating rubber containing hydrocarbon and another substance which is normally insoluble in water and which is highly water absorbent which comprises subjecting the rubber to the action of a medium capable of swelling a protein in the rubber and then subjecting the expanded rubber to a treatment to convert, by hydrolysis, the normally water insoluble substance into a soluble substance, and finally removing said substance by washing.

9. A process of treating material containing rubber hydrocarbon and a protein or other naturally occurring nitrogenous substance which comprises subjecting the material to the action of an expanding medium and subjecting the expanded material to the action of superheated steam and water to convert, by hydrolysis, the protein into a water soluble body, and finally removing said body by washing.

10. The manufacture from rubber of an insulating material which comprises swelling the rubber by treatment with an organic solvent, such as benzene appreciably soluble in superheated water and then subjecting the swollen rubber to a treatment with superheated water and steam to convert by hydrolysis the water insoluble to soluble bodies and finally removing said bodies by washing.

11. The manufacture from rubber of an insulating material which comprises subjecting the rubber to an atmosphere of benzene until it has absorbed about 10% of its weight of the benzene, then subjecting the swollen rubber to a treatment with superheated water and steam to convert by hydrolysis the water insoluble to soluble bodies and finally removing said bodies by washing.

12. The method of manufacturing an insulating material which comprises swelling rubber by treatment with an organic solvent appreciably soluble in superheated water and then subjecting the swollen rubber to a treatment with superheated water and steam to convert by hydrolysis the water insoluble into soluble bodies, and finally removing said bodies by washing.

13. A method of manufacturing an insulating material which comprises swelling rubber by subjecting it to an atmosphere charged with a vapour of an organic solvent appreciably soluble in superheated water and then subjecting the swollen rubber to a treatment with superheated water and steam in order to convert by hydrolysis the water insoluble to soluble bodies and finally removing said bodies by washing.

WILLOUGHBY STATHAM SMITH.
HENRY JOSEPH GARNETT.
JOHN NORMAN DEAN.
BERNARD JAMES HABGOOD.
HENRY CHARLES CHANNON.